United States Patent [19]
Ishii

[11] Patent Number: 6,167,470
[45] Date of Patent: Dec. 26, 2000

[54] SCSI SYSTEM CAPABLE OF CONNECTING MAXIMUM NUMBER OF HIGH SPEED SCSI DEVICES WITH MAINTAINING POSITIVE OPERATION

[75] Inventor: Masahiro Ishii, Tokyo, Japan

[73] Assignee: Mitsubishi Denki Kabushiki Kaisha, Tokyo, Japan

[21] Appl. No.: 09/108,240

[22] Filed: Jul. 1, 1998

[30] Foreign Application Priority Data

Jan. 13, 1998 [JP] Japan .................................. 10-004561

[51] Int. Cl.[7] .................................................. G06F 13/12
[52] U.S. Cl. ............................ 710/62; 710/49; 710/129; 710/130
[58] Field of Search ............................... 370/100; 375/12; 348/472; 340/147; 358/141; 710/131, 49, 129, 130, 62; 712/400

[56] References Cited

U.S. PATENT DOCUMENTS

| | | | |
|---|---|---|---|
| Re. 34,810 | 12/1994 | Lemaine et al. | 348/472 |
| 3,618,020 | 11/1971 | Parker | 340/147 |
| 4,720,744 | 1/1988 | Washi et al. | 358/141 |
| 4,723,240 | 2/1988 | Fiorette et al. | 370/100 |
| 5,327,459 | 7/1994 | Hara et al. | 375/12 |
| 5,345,565 | 9/1994 | Jibbe et al. | 710/130 |
| 5,572,659 | 11/1996 | Iwasa et al. | |
| 5,696,930 | 12/1997 | Garetz et al. | 712/400 |
| 5,699,533 | 12/1997 | Sakai | 710/131 |
| 5,841,995 | 11/1998 | Ogawa | 710/129 |
| 6,055,587 | 4/2000 | Asami et al. | 710/49 |

FOREIGN PATENT DOCUMENTS

| | | | |
|---|---|---|---|
| 357093743A | 6/1982 | Japan | H04J 3/00 |
| 1-224820 | 9/1989 | Japan . | |
| 5-341918 | 2/1993 | Japan . | |
| 96719 | 10/1997 | Japan . | |

*Primary Examiner*—Thomas C. Lee
*Assistant Examiner*—Jibreel Speight
*Attorney, Agent, or Firm*—Leydig, Voit & Mayer, Ltd.

[57] ABSTRACT

A SCSI system including a SCSI controller, daisy-chained SCSI connectors to which SCSI devices are to be connected, and a SCSI cable interconnecting the SCSI connectors. The SCSI controller includes a circuit for controlling a REQ signal that is allowed to flow through two lines in the SCSI cable, and for controlling an ACK signal that is also allowed to flow through another two lines in the SCSI cable. One of the two lines for conveying the REQ signal alternately connects an unused pin and a REC pin of two successive SCSI connectors, and the other of the two lines alternately connects a REQ pin and an unused pin of the two successive controllers. The two lines for conveying the ACK signal interconnect the SCSI connectors in a similar manner. This enables the load capacitance of the REQ and ACK control signal lines to be reduced, thereby ensuring normal operation of up to seven high speed SCSI devices, that is, the maximum number of devices connectable to the SCSI system.

8 Claims, 8 Drawing Sheets

SCSI SYSTEM CAPABLE OF CONNECTING MAXIMUM NUMBER OF HIGH SPEED SCSI DEVICES WITH MAINTAINING POSITIVE OPERATION

BACKGROUND OF THE INVENTION

1. Field of the Invention

The present invention relates to an input/output interface system called a SCSI (Small Computer System Interface) for connecting a host computer with input/output devices such as hard disk drives and CD-ROM drives.

2. Description of Related Art

FIG. 7 shows a conventional SCSI system. In FIG. 7, the reference numeral 101 designates a SCSI system. It comprises as its main components a SCSI controller 102, a SCSI cable 103 for interconnecting the SCSI controller 102 with SCSI devices 150 (150a–150n), such as hard disk drives and CD-ROM drives, and a terminator 104 for terminating the SCSI. The reference numeral 105 designates a SCSI cable 103 signal controller for controlling SCSI signals in the SCSI controller 102, 106 designates a terminator for terminating the SCSI in the SCSI controller 102, and 107 designates a bus in the SCSI controller 102. Reference numerals 150a–150n each designate a SCSI device such as a hard disk drive or CD-ROM drive, the reference numeral 151 designates a host computer, and 152 designates a bus interconnecting the host computer 151 with SCSI controller 102.

FIG. 8 is an enlarged diagram showing the SCSI cable 103 in the conventional SCSI system 101. In FIG. 8, reference numerals 111a–111n each designate a SCSI connector to which the SCSI device is connected, and the reference numeral 112 designates a cable for interconnecting the SCSI connectors 111a–111n. The cable 112 comprises a line (called "REQ# signal line" from now on) for conveying a REQ# signal and a line (called "ACK# signal line" below) for conveying an ACK# signal, where the symbol "#" denotes "active low", and hence the REQ# signal refers to an active low REQ signal, and the ACK# signal refers to an active low ACK signal. The SCSI connectors 111a–111n each include two unused pins. Incidentally, in FIG. 8, a data bus and the other control lines are not shown.

Next, the operation of the conventional SCSI system 101 will be described with reference to timing charts as shown in FIGS. 4A and 4B. Receiving a command to carry out data exchange with a target SCSI device 150 from the higher rank host computer 151 through the bus 152, the SCSI controller 102 first establishes a logical connection with the target SCSI device 150.

Then, the SCSI controller 102 carries out the data exchange. First, a case will be described in which data is read from the SCSI device 150. In the read operation, the SCSI device 150 transfers data to the SCSI controller 102 by placing it on the data bus of the SCSI in synchronism with the control signal REQ# as shown in FIG. 4A. The SCSI controller 102 samples the data at the rising edge of the REQ# signal. Subsequently, it sends back the control signal ACK# to the SCSI device 150 in synchronism with the REQ# signal to establish synchronization with the SCSI device 150. By repeating the foregoing operations, the SCSI device 150 transfers the data to the SCSI controller 102.

Likewise, when the SCSI controller 102 writes data to the target SCSI device 150, the SCSI device 150 first sends the REQ# signal to the SCSI controller 102. Upon recognizing the REQ# signal, the SCSI controller 102 asserts the ACK# signal in synchronism with this, and places the data on the data bus of the SCSI. The SCSI device 150 samples the data at the rising edge of the ACK# signal. By repeating the operations, the SCSI controller 102 transfers the data to the SCSI device 150.

Thus, the SCSI system transfers data in synchronism with the rising edge of the REQ# signal or ACK# signal. This means that these two signals must have a frequency twice that of the other SCSI signals. In addition, since the REQ# signal and ACK# signal are each interconnected in the same manner as the other signals in the cable 112 as shown in FIG. 8, its load capacitance will increase with the number of the SCSI devices connected to the SCSI connectors 111, thereby increasing the noise level caused by reflection or the like. This presents a problem in that normal operation cannot be ensured owing to increasing distortion in the REQ# signal or ACK# signal that will occur when the maximum of seven SCSI devices are connected in a modern fast SCSI system such as a Ultra SCSI system which transfers data at a high speed.

In view of this, Japanese patent application laid-open Hei. No. 9-6719 discloses an interface system with a repeater for solving the problem. This system, however, requires the repeater for interconnecting the maximum of seven SCSI devices, complicating the connection configuration. In addition, once the REQ# signal or ACK# signal is asserted LOW in the repeater, it is latched and cannot be returned to HIGH. This presents another problem of being unable to achieve the function as the SCSI system.

SUMMARY OF THE INVENTION

The present invention is implemented to solve the foregoing problem. It is therefore an object of the present invention to provide a SCSI system capable of interconnecting the maximum of seven SCSI devices in a high speed interface, like the Ultra SCSI system, as well as in a low speed SCSI system, with a simple connection configuration without using any additional devices such as a repeater. This is achieved by utilizing the fact that REQ# signals and ACK# signal are each unidirectional signals in actual SCSI devices.

According to a first aspect of the present invention, there is provided a SCSI (small computer systems interface) system comprising two or more lines for conveying a REQ signal and two or more lines for conveying an ACK signal, the REQ signal and ACK signal being a SCSI signal.

According to a second aspect of the present invention, there is provided a SCSI system comprising a SCSI controller that includes a circuit for controlling a REQ signal and an ACK signal passing through two or more lines.

Here, the SCSI system may further comprise a SCSI cable including two lines for conveying the REQ signal and two lines for conveying the ACK signal, wherein one of the two lines for conveying the REQ signal may connect an unused pin of a first SCSI connector with a REQ pin of a second SCSI connector, and the other of the two lines for conveying the REQ signal may connect a REQ pin of the first SCSI connector with an unused pin of the second connector, the first SCSI connector and the second SCSI connector being any two adjacent connectors connected by the SCSI cable, and wherein one of the two lines for conveying the ACK signal may connect another unused pin of the first SCSI connector with an ACK pin of the second SCSI connector, and the other of the two lines for conveying the ACK signal may connect an ACK pin of the first SCSI connector with another unused pin of the second connector.

According to a third aspect of the present invention, there is provided a SCSI system comprising a backplane including a circuit for controlling a REQ signal and an ACK signal flowing through two more lines.

Here, the backplane may comprise a SCSI signal pattern including the REQ signal flowing through two or more lines and the ACK signal flowing through two or more lines.

According to a fourth aspect of the present invention, there is provided a SCSI cable comprising: two lines for conveying a REQ signal; and two lines for conveying an ACK signal, wherein one of the two lines for conveying the REQ signal may connect an unused pin of a first SCSI connector with a REQ pin of a second SCSI connector, and the other of the two lines for conveying the REQ signal may connect a REQ pin of the first SCSI connector with an unused pin of the second connector, the first SCSI connector and the second SCSI connector being any two adjacent connectors connected by the SCSI cable, and wherein one of the two lines for conveying the ACK signal may connect another unused pin of the first SCSI connector with an ACK pin of the second SCSI connector, and the other of the two lines for conveying the ACK signal may connect an ACK pin of the first SCSI connector with another unused pin of the second connector.

According to a fifth aspect of the present invention, there is provided a SCSI backplane comprising a circuit for controlling a REQ signal and an ACK signal flowing through two or more lines.

Here, the backplane may comprise a SCSI signal pattern including the REQ signal flowing through two or more lines and the ACK signal flowing through two or more lines.

According to a sixth aspect of the present invention, there is provided a SCSI controller comprising a circuit for controlling a REQ signal and an ACK signal flowing through two or more lines.

BRIEF DESCRIPTION OF THE DRAWINGS

FIGS. 4A and 4B are timing charts showing data exchange operations in the embodiments 1 and 2, wherein FIG. 4A illustrates data read operation, and FIG. 4B illustrates data write operation;

DETAILED DESCRIPTION OF THE PREFERRED EMBODIMENTS

The invention will now be described with reference to the accompanying drawings.

Embodiment 1

Figure 1:
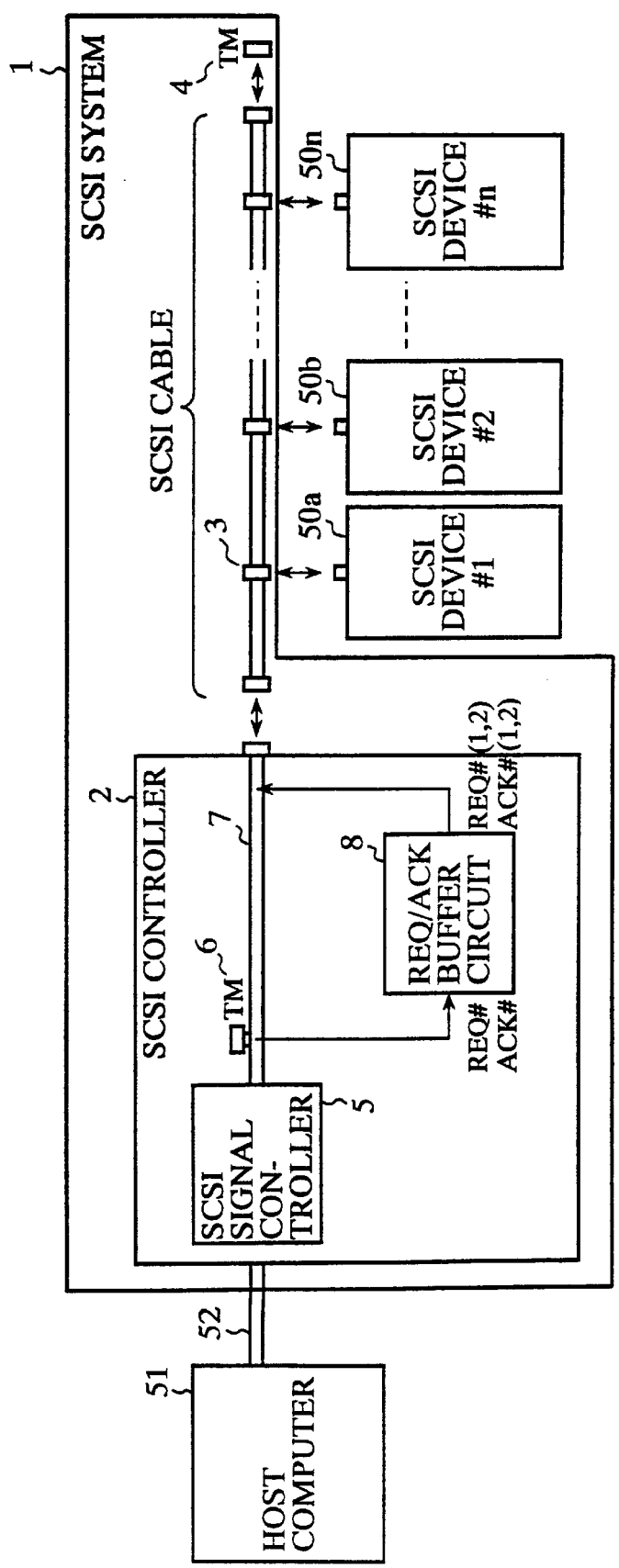
FIG. 1 is a block diagram showing an embodiment 1 of a SCSI system in accordance with the present invention.

An embodiment 1 in accordance with the present invention will now be described with reference to FIGS. 1–4. In FIG. 1, the reference numeral 1 designates a SCSI system. The SCSI system 1 comprises as its main components a SCSI controller 2, a SCSI cable 3 for connecting the SCSI controller 2 with SCSI devices 50 (50a–50n), and a terminator 4 for terminating the SCSI. The reference numeral 5 designates a SCSI signal controller for controlling a SCSI signal in the SCSI controller 2, 6 designates a terminator for terminating the SCSI in the SCSI controller 2, 7 designates a bus in the SCSI controller 2, and 8 designates a REQ/ACK buffer circuit for controlling REQ# signals and ACK# signals, which flow through two lines, respectively. Reference numerals 50a–50n each designate a SCSI device such as a hard disk drive or CD-ROM drive, and the reference numeral 51 designates a higher rank host computer, and 52 designates a bus for interconnecting the host computer 51 with the SCSI controller 2.

Figure 2:
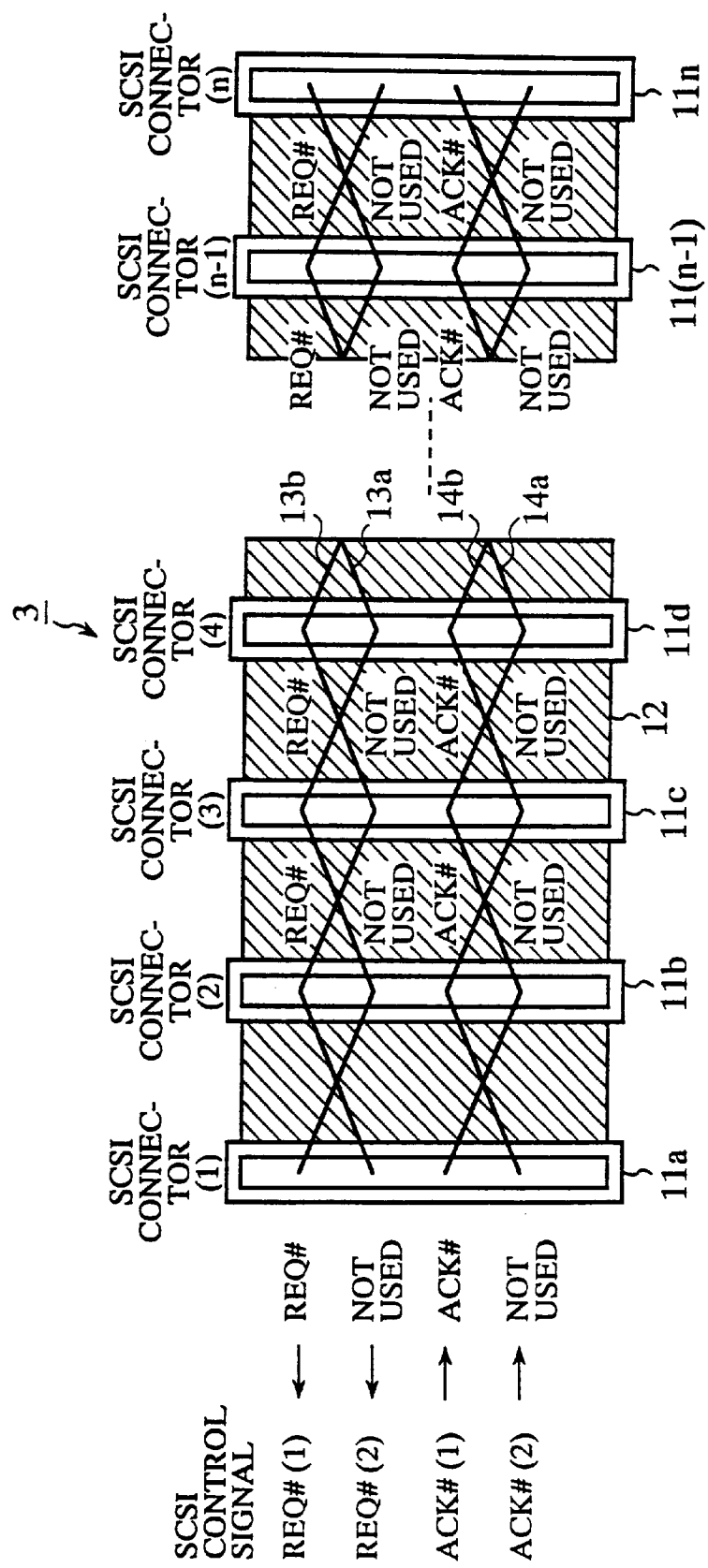
FIG. 2 is a diagram showing a structure of a SCSI cable in the embodiment 1.

FIG. 2 is a diagram showing details of the SCSI cable 3 as shown in FIG. 1. In FIG. 2, reference numerals 11a–11n each designate a SCSI connector to which a SCSI device is connected, and the reference numeral 12 designates a cable for interconnecting the SCSI connectors 11a–11n. The cable 12 comprises, as REQ# signal lines, a REQ#(1) signal line 13a and a REQ#(2) signal line 13b, and, as ACK# signal lines, an ACK#(1) signal line 14a and an ACK#(2) signal line 14b. The REQ#(1) signal line 13a and REQ#(2) signal line 13b each alternately interconnect a REQ# signal pin with an unused pin of the successive SCSI connectors, and ACK#(1) signal line 14a and ACK#(2) signal line 14b each alternately interconnect an ACK# signal pin with an unused pin of the successive SCSI connectors.

Figure 3:
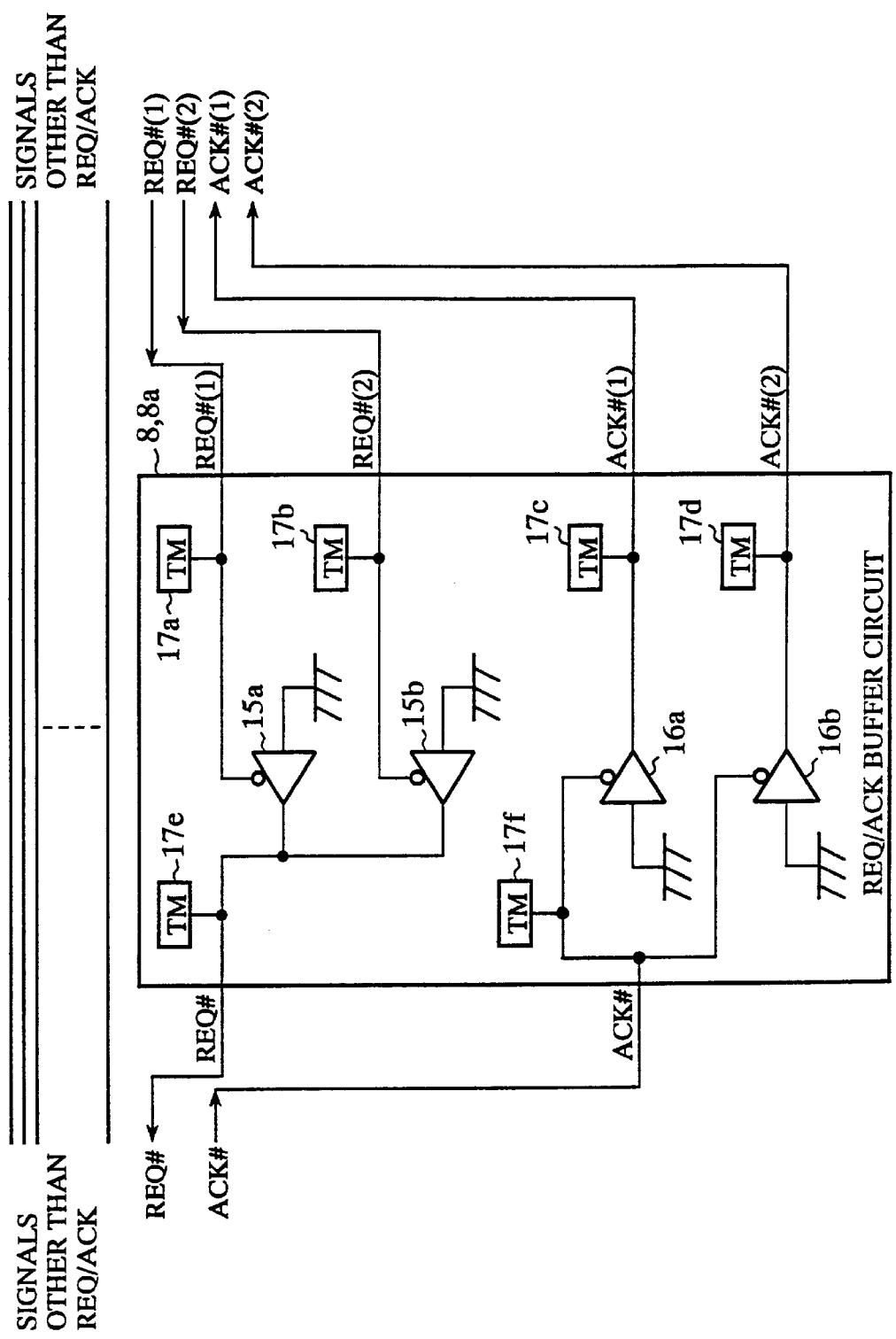
FIG. 3 is a circuit diagram showing a REQ/ACK buffer circuit in the embodiment 1.

FIG. 3 is a circuit diagram showing an internal configuration of the REQ/ACK buffer circuit 8 as shown in FIG. 1. In FIG. 3, the reference numeral 15a designates a tristate buffer for receiving the REQ#(1) signal from the REQ#(1) signal line 13a, 15b designates a tristate buffer for receiving the REQ#(2) signal from the REQ#(2) signal line 13b, 16a designates a tristate buffer for driving the ACK#(1) signal to the ACK#(1) signal line 14a, and 16b designates a tristate buffer for driving the ACK#(2) signal to the ACK#(2) signal line 14b, and each of reference numerals 17s (17a–17f) designates a terminator for terminating the pair of REQ signals and the pair of ACK signals.

Next, the operation of the present embodiment 1 will be described.

Receiving from the higher rank host computer 51 a command to carry out data exchange with a target SCSI device 50 (one of the SCSI devices 50a–50n), the SCSI controller 2 first establishes a logical connection with the target SCSI device 50.

Figure 4A:
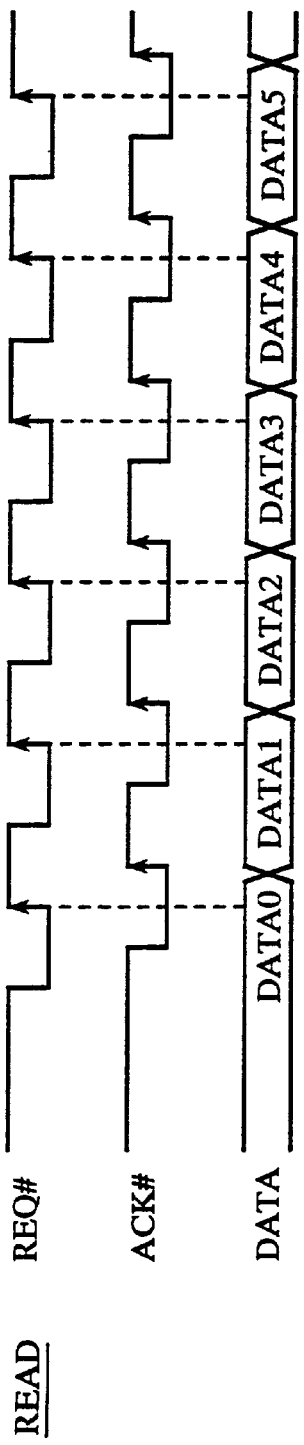

Then, the SCSI controller 2 carries out the data exchange. First, a case will be described in which it reads data from the SCSI device 50. In the read operation, the SCSI device 50 transfers data to the SCSI controller 2 by placing it on the bus of the SCSI in synchronism with a control signal REQ# as shown in FIG. 4A. If the connection is established between the SCSI controller 2 and the SCSI device 50 which is connected to the SCSI connector(2) 11b of FIG. 2, the REQ#(2) signal of the SCSI controller 2 is asserted LOW via the unused pin of the SCSI connector(1) 11a. Thus, the tristate buffer 15b of FIG. 3 drives LOW so that the REQ# is driven to LOW, and the SCSI controller 2 recognizes the REQ# signal. The SCSI controller 2 samples the data at the rising edge of the REQ# signal according to the SCSI standard.

Upon receiving the REQ# signal, the SCSI controller 2 asserts the control signal ACK# to be LOW to establish the synchronization with the SCSI device 50. Thus, the tristate buffers 16a and 16b each drive LOW so that the ACK# signal of the SCSI connector(2) 11b is asserted LOW via the ACK#(2) signal line 14b.

Likewise, when the SCSI controller 2 writes data to the target SCSI device 50, the SCSI device 50 asserts the REQ# signal to be LOW. This causes the REQ#(2) signal of the SCSI controller 2 to be asserted LOW through the REQ# pin of the SCSI connector(2) 11b and the unused pin of the SCSI connector(1) 11a. Thus, the tristate buffer 15b of FIG. 3 is placed at LOW. As a result, the REQ# signal of the SCSI controller 2 is asserted LOW, and the SCSI controller 2 recognizes the start of the data transfer.

Upon recognizing the REQ# signal, the SCSI controller 2 asserts the ACK# signal in synchronism with this, and places the data on the data bus of the SCSI. The ACK# signal drives the tristate buffers 16a and 16b of FIG. 3 to LOW so that the ACK#(2) signal is asserted LOW, and transferred to the SCSI device 50 via the unused pin of the SCSI connector(1) 11a and the ACK# signal pin of the SCSI connector(2) 11b. Since the SCSI controller 2 places the data on the data bus of the SCSI in synchronism with the ACK# signal, the target SCSI device 50 samples the data at the rising edge of the ACK# signal.

Although the foregoing description of the operation is provided when the target SCSI device 50 is connected to the SCSI connector(2) 11b, it also applies when the target SCSI device 50 is connected to any one of the even number SCSI connectors. When the target SCSI device is connected to any one of the odd number SCSI connectors, the operation is similar to the foregoing except that the signals pass through different pins and tristate buffers.

With such an arrangement and operation, the present embodiment 1 can halve the electrical load capacitance per line of the REQ# signal lines and ACK# signal lines of the SCSI system as compared with that of the conventional SCSI system. As a result, a high-speed SCSI system like a Ultra SCSI system can interconnect the same number of SCSI devices as a low SCSI system can. Although the SCSI controller 2 is connected to the SCSI connector(1) 11a and the SCSI devices 50 are connected to the remaining connectors 11b–11n in the present embodiment 1, the SCSI controller 2 can be connected to any one of the connectors 11a–11n because they have the same structure, achieving the same operation.

If the SCSI controller 2 of the present embodiment 1 is used in conjunction with the conventional SCSI cable 103 but not with the SCSI cable 3, the load capacitance cannot be reduced although the SCSI devices can operate within the number allowed in the conventional system.

Embodiment 2

Figure 5:
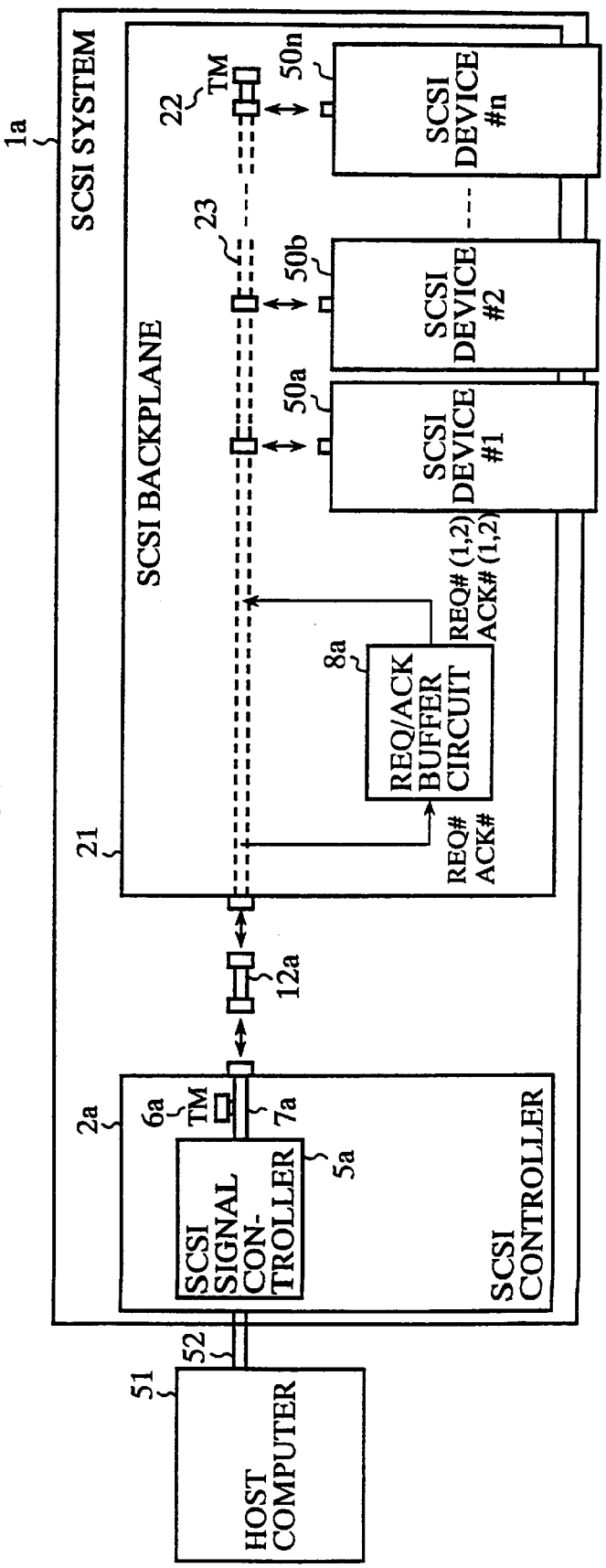
FIG. 5 is a block diagram showing an embodiment 2 of the SCSI system in accordance with the present invention.
Figure 6:
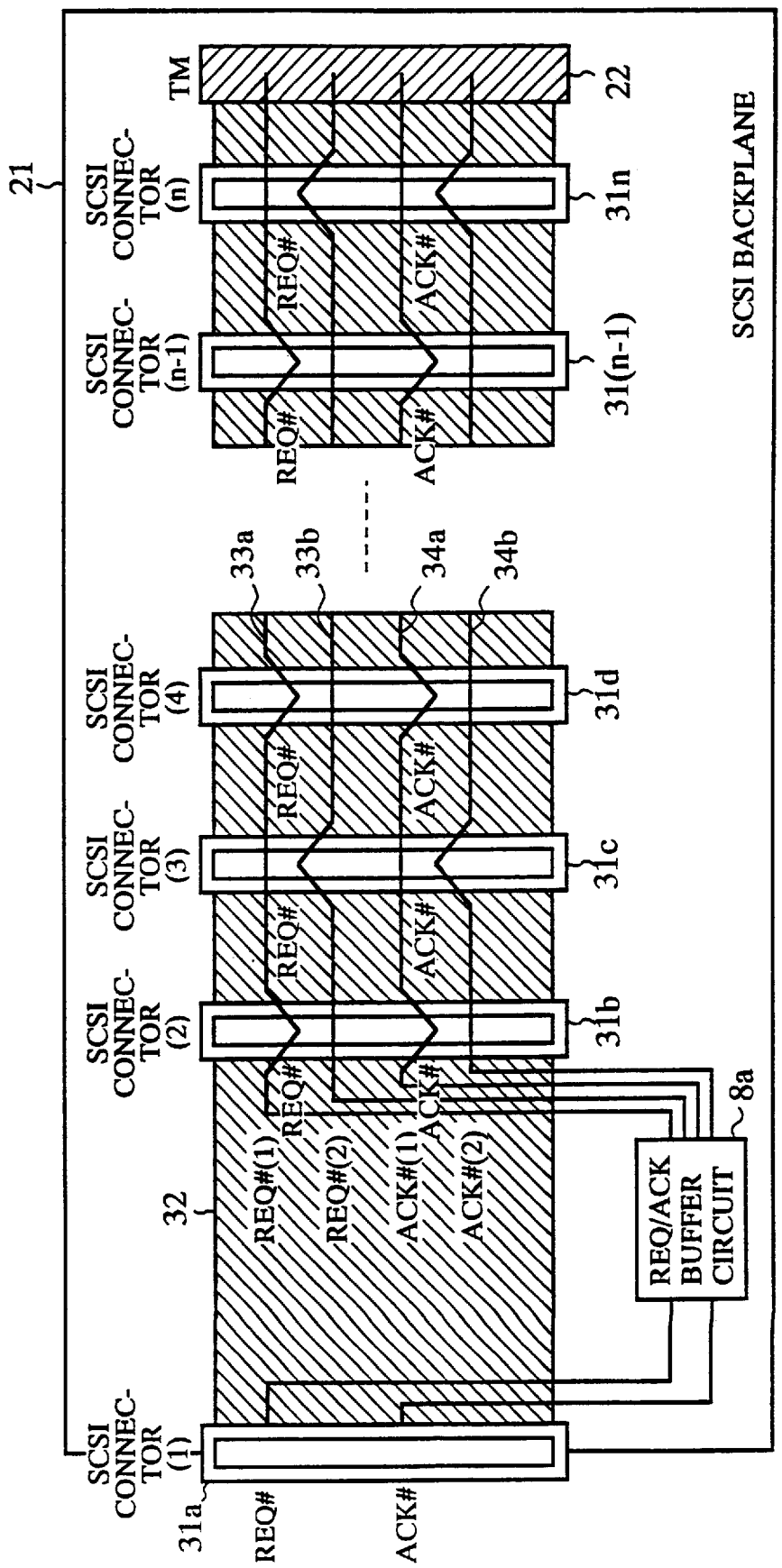
FIG. 6 is a diagram showing a structure of a SCSI bus on a SCSI backplane in the embodiment 2.
Figure 7:
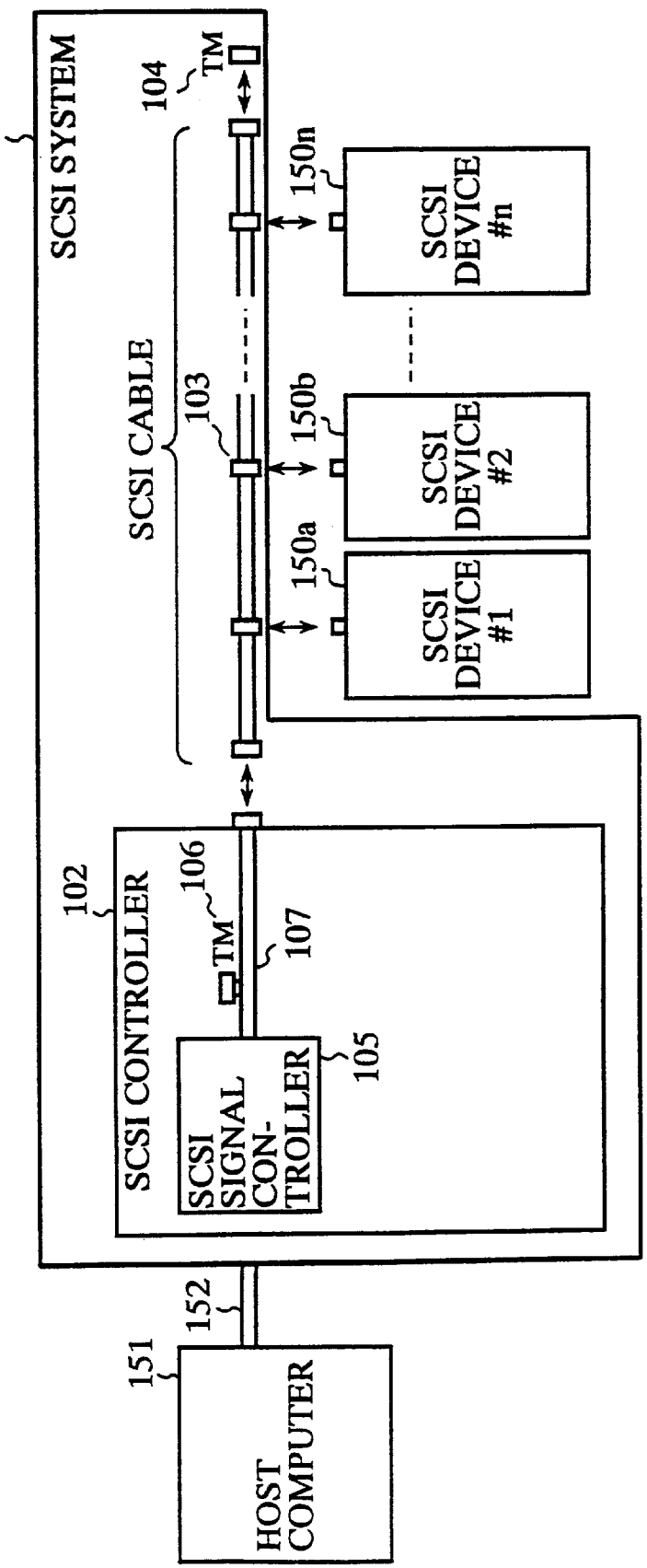
FIG. 7 is a block diagram showing a conventional SCSI system.
Figure 8:
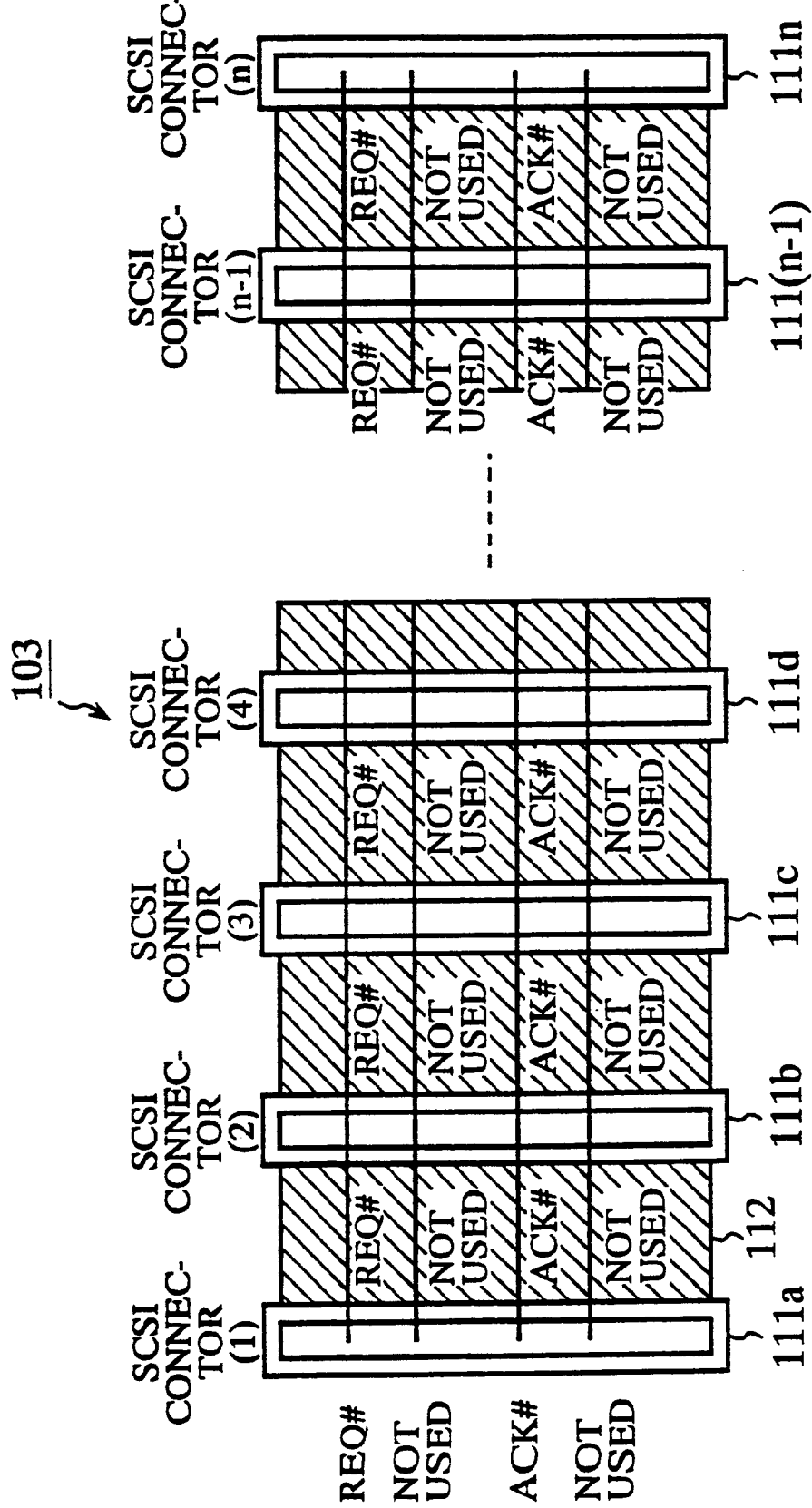
FIG. 8 is a diagram showing a structure of a SCSI cable in the conventional SCSI system.

FIGS. 5 and 6 are block diagrams showing an embodiment 2 in accordance with the present invention.

Recently, an increasing number of SCSI devices are directly connected to SCSI connectors mounted on a printed circuit board which is referred to as a SCSI backplane, instead of connecting them through a cable, to support the live plugging and unplugging of hard disk drives or the like, particularly in servers. The present embodiment 2 has on the SCSI backplane the REQ/ACK buffer circuit of the embodiment 1 in the SCSI controller including such a SCSI backplane.

In FIG. 5, the reference numeral 1a designates a SCSI system which comprises a SCSI controller 2a, SCSI backplane 21 and SCSI cable 12a for interconnecting the SCSI controller 2a and SCSI backplane 21. The reference numeral 5a designates a SCSI signal controller for controlling the SCSI signal in the SCSI controller 2a, 6a designates a terminator for terminating in the SCSI controller 2a the SCSI, and 7a designates a SCSI signal bus in the SCSI controller 2a. The reference numeral 22 designates a terminator on the SCSI backplane 21, 23 designates a SCSI signal bus on the SCSI backplane 21 and 8a designates a REQ/ACK buffer circuit mounted on the SCSI backplane 21. Reference numerals 50a–50n each designate a SCSI device such as a hard disk drive or CD drive, the reference numeral 51 designates a higher rank host computer, and 52 designates a bus for connecting the host computer 51 with the SCSI controller 2a.

FIG. 6 is a diagram showing details of the SCSI signal bus 23 on the SCSI backplane 21 as shown in FIG. 5. In FIG. 6, reference numerals 31a–31n each designate a SCSI connector, and 32 designates a SCSI signal pattern for interconnecting the SCSI connectors 31a–31n. The SCSI backplane 21 is a printed circuit board, to which the SCSI controller 2a is fixedly connected to a particular SCSI connector(1) 31a, and hence it is not necessary to make connections through unused pins as in the connection through the cable. The SCSI signal pattern is arranged such that a pair of REQ# signal lines, REQ#(1) signal line 33a and REQ#(2) signal line 33b, are alternately connected to every one of two successive SCSI connectors, and a pair of ACK# signal lines, ACK#(1) signal line 34a and ACK#(2) signal line 34b, are also alternately connected to every one of two successive SCSI connectors.

Figure 4B:
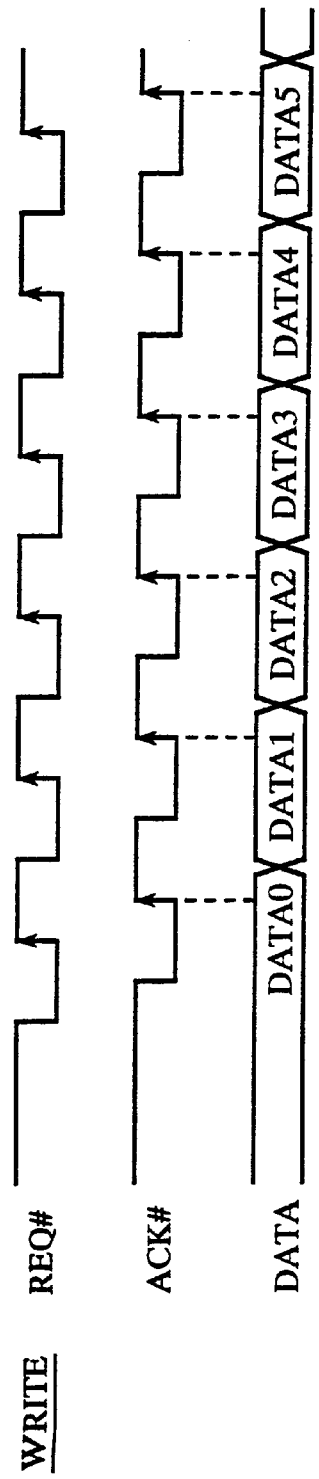

The operation of the embodiment 2 will now be described with reference to FIGS. 5 and 6 in connection with FIGS. 3 and 4.

If a target SCSI device 50 is connected to an even number SCSI connector 31 of FIG. 6 as in the embodiment 1, it transfers the REQ# signal to the SCSI controller 2a through the REQ#(1) signal line 33a and the tristate buffer 15a shown in FIG. 3. In response to this, the SCSI controller 2a transfers the ACK# signal to the SCSI device 50 through the tristate buffer 16a and ACK#(1) signal line 34a.

On the other hand, if the target SCSI device 50 is connected to an odd number SCSI connector 31, it transfers the REQ# signal to the SCSI controller 2a through the REQ#(2) signal line 33b and the tristate buffer 15b shown in FIG. 3. In response to this, the SCSI controller 2a transfers the ACK#(2) signal to the SCSI device 50 through the tristate buffer 16b and ACK#(2) signal line 34b.

With such an arrangement and operation, the present embodiment 2 can halve the electrical load capacitance per line of the SCSI system as compared with that of the conventional interface system. As a result, a high-speed SCSI system like a Ultra SCSI system can interconnect the same number of SCSI devices as a low SCSI system can.

In addition, the conventional SCSI controller and SCSI cable can be applied as the SCSI controller 2a and SCSI cable 12a without change because they are not different.

Furthermore, increasing the number of tristate buffers in the REQ/ACK buffer circuit 8a enables the electrical load capacitance to be reduced by a factor of three, four, and so forth, making it possible to connect a larger number of SCSI devices.

Although the REQ/ACK buffer circuit 8a is mounted on the SCSI backplane 21 in the present embodiment 2, it can be placed on the SCSI controller 2a, in which case, the SCSI signal pattern on the SCSI backplane 21 has a pair of REQ# signal lines and a pair of ACK# signal lines, each alternately connected to every other one of successive SCSI connectors.

What is claimed is:

1. A small computer systems interface (SCSI) system comprising a SCSI controller that includes a buffer circuit for controlling a REQ signal and an ACK signal, each of the REQ and ACK signals passing through at least two lines, wherein said buffer circuit includes first and second tristate buffers receiving the ACK signal and generating, selectively, first and second ACK signals, respectively, and third and fourth tristate buffers receiving first and second REQ signals to produce the REQ signal.

2. The SCSI system as claimed in claim 1, further comprising an SCSI cable including first and second lines for conveying the REQ signal and third and fourth lines for conveying the ACK signal, wherein said first line connects an unused pin of a first SCSI connector with a REQ pin of a second SCSI connector, and the second line connects a REQ pin of the first SCSI connector with an unused pin of said second SCSI connector, said first SCSI connector and said second SCSI connector being any two adjacent SCSI connectors connected by said SCSI cable, and wherein said third line connects another unused pin of said first SCSI connector with an ACK pin of said second SCSI connector, and said fourth line connects an ACK pin of said first SCSI connector with another unused pin of said second SCSI connector.

3. A small computer systems interface (SCSI) system comprising a backplane including a buffer circuit for controlling a REQ signal and an ACK signal, each of the REQ and ACK signals flowing through at least two lines, wherein said buffer circuit includes first and second tristate buffers receiving the ACK signal and generating, selectively, first and second ACK signals, respectively, and third and fourth tristate buffers receiving first and second REQ signals to produce the REQ signal.

4. The SCSI system as claimed in claim 3, wherein said backplane comprises an SCSI signal pattern including the REQ signal flowing through at least two lines and the ACK signal flowing through at least two lines.

5. A small computer systems interface (SCSI) cable comprising:
first and second lines for conveying a REQ signal; and
third and fourth lines for conveying an ACK signal, wherein said first line connects an unused pin of a first SCSI connector with a REQ pin of a second SCSI connector, and said second line connects a REQ pin of said first SCSI connector with an unused pin of said second SCSI connector, said first SCSI connector and said second SCSI connector being any two adjacent SCSI connectors connected by said SCSI cable, and wherein said third line connects another unused pin of said first SCSI connector with an ACK pin of said second SCSI connector, and said fourth line connects an ACK pin of said first SCSI connector with another unused pin of said second SCSI connector.

6. A small computer system interface (SCSI) backplane comprising a controller for controlling a REQ signal and an ACK signal, each of the REQ and ACK signals flowing through at least two lines, wherein said controller includes a buffer circuit, said buffer circuit comprising first and second tristate buffers receiving the ACK signal and generating, selectively, first and second ACK signals, respectively, and third and fourth tristate buffers receiving first and second REQ signals to produce the REQ signal.

7. The SCSI backplane as claimed in claim 6, wherein said backplane comprises an SCSI signal pattern, including the REQ signal, flowing through at least two lines.

8. A small computer systems interface (SCSI) controller comprising a buffer circuit for controlling a REQ signal and an ACK signal, each of the REQ and ACK signals flowing through at least two lines, wherein said buffer circuit includes first and second tristate buffers receiving the ACK signal and generating, selectively, first and second ACK signals, respectively, and third and fourth tristate buffers receiving first and second REQ signals to produce the REQ signal.

* * * * *